United States Patent
Lyon et al.

(10) Patent No.: US 7,226,360 B2
(45) Date of Patent: Jun. 5, 2007

(54) GREASE CAP FOR A CONSTANT VELOCITY JOINT

(75) Inventors: James Alexander Lyon, Troy, MI (US); Salvatore Filippo Leone, Shelby Township, MI (US); Daniel Reibscheid, Rochester, MI (US); Ramon Christopher Kuczera, Clarkston, MI (US); J. Todd Lee, Forest, VA (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 272 days.

(21) Appl. No.: 10/319,153

(22) Filed: Dec. 14, 2002

(65) Prior Publication Data

US 2003/0127908 A1 Jul. 10, 2003

Related U.S. Application Data

(60) Provisional application No. 60/340,228, filed on Dec. 14, 2001.

(51) Int. Cl.
*F16D 3/16* (2006.01)

(52) U.S. Cl. .................... 464/146; 464/167
(58) Field of Classification Search ........ 464/170–171, 464/177–178, 904, 906, 146, 167; 301/108.1, 301/108.3, 124.1, 137; 180/380–381, 384, 180/379, 902; 280/777, 784; 285/1–4, 304, 285/901; 220/203.08, 276, 265–266
See application file for complete search history.

(56) References Cited

U.S. PATENT DOCUMENTS

| | | | | |
|---|---|---|---|---|
| 1,933,117 A | * | 10/1933 | Markle | 220/265 |
| 1,987,678 A | * | 1/1935 | Goddard et al. | 464/124 |
| 4,202,184 A | * | 5/1980 | Krude et al. | 464/146 |
| 4,319,467 A | * | 3/1982 | Hegler et al. | 464/173 |
| 4,424,047 A | * | 1/1984 | Welschof et al. | 464/145 |
| 4,427,085 A | * | 1/1984 | Aucktor | 180/379 |
| 4,487,593 A | * | 12/1984 | Welschof Hans-Heinrich | 464/111 |
| 5,192,117 A | * | 3/1993 | Kuck | 301/108.1 |
| 5,454,453 A | * | 10/1995 | Meyer et al. | 180/377 |
| 5,582,546 A | * | 12/1996 | Welschof | 464/141 |
| 5,836,825 A | * | 11/1998 | Yamane | 464/181 |
| 5,853,250 A | * | 12/1998 | Krude et al. | 384/544 |
| 6,139,216 A | * | 10/2000 | Bertetti | 403/359.3 |
| 6,171,196 B1 | * | 1/2001 | Welschof | 464/146 |
| 6,203,441 B1 | * | 3/2001 | Iarrera | 464/182 |
| 6,286,702 B1 | * | 9/2001 | Buermann | 220/229 |
| 6,524,012 B1 | * | 2/2003 | Uchman | 384/544 |

(Continued)

*Primary Examiner*—Jason R. Bellinger
(74) *Attorney, Agent, or Firm*—Jennifer M. Brumbaugh; Mick A. Nylander

(57) ABSTRACT

A frangible grease cap for use in a collapsible constant velocity joint. The frangible grease cap includes a body generally having a circular shape. The frangible grease cap includes an orifice through a center section of the body. The grease cap also includes at least one reduced thickness groove on a surface of the body of the constant velocity joint grease cap. The grease cap has a circumferential flange extending from an end thereof. The grease cap includes reduced thickness grooves having predetermined shapes which will peel or rupture when a predetermined axial load is applied thereto. The grease cap is secured to an inner surface of an outer race through any known securing method which also influences when the grease cap will fracture during or completely release during a crash event when a predetermined axial load is applied thereon.

20 Claims, 13 Drawing Sheets

U.S. PATENT DOCUMENTS

| | | | |
|---|---|---|---|
| 6,585,601 B2 * | 7/2003 | Booker et al. | 464/146 |
| 6,666,771 B2 * | 12/2003 | Boutin | 464/146 |
| 6,766,877 B2 * | 7/2004 | Blumke et al. | 180/379 |
| 6,913,105 B2 * | 7/2005 | Masuda et al. | 180/381 |

* cited by examiner

GREASE CAP FOR A CONSTANT VELOCITY JOINT

This application claims benefit of application Ser. No. 60/340,228 issued on Dec. 14, 2001.

BACKGROUND OF THE INVENTION

1. Field of the Invention

The present invention generally relates to vehicle propeller shafts and constant velocity joints, and more particularly relates to a cap for use on a constant velocity joint that will release at a predetermined time in a crash event, and with a predetermined load, thus giving the constant velocity joint and the propeller shaft in a motor vehicle a specific crash behavior.

2. Description of Related Art

Propeller shafts (prop shafts) are well known in the art for use in vehicle propulsion systems. The prop shaft may be a multi-piece prop shaft or a solid/single-piece prop shaft depending on the type of drive train system on the vehicle therein. The prop shafts are generally used to transfer torque and rotational forces to the rear axle and rear wheels in all wheel drive, rear wheel drive and four wheel drive vehicles. They also may be used for front axle vehicles and four wheel drive vehicles to deliver the necessary power to the front drive axle. The multi-piece propeller shafts generally are supported by a center bearing and have the necessary support bracketry. This will allow the drive shaft to rotate and transfer the necessary power to the front or rear axle of the automotive vehicle.

In recent years it has also become desirable for the propeller shaft of an automotive vehicle to become a more proactive piece of equipment designed for crash worthiness within the automotive vehicle. This crash worthiness also must be accompanied by prop shafts that are lighter in weight, less expensive and easier to manufacture and install. With regards to crash worthiness of the prop shaft generally, during the crash of a vehicle the body will shorten and deform. Therefore, for safety reasons the propeller shaft should also be able to reduce its length during a crash event at or below a specified load. In the prior art this length reduction is generally achieved by having the prop shaft telescope to obtain a shorter overall length for the prop shaft. The ability of the prop shaft to collapse and telescope within itself will prevent the prop shaft from buckling which may lead to a penetration of the passenger compartment or damaging vehicle components in close proximity to the propeller shaft such as gas tanks, drive axles and other drive train components. Some of the prior art multi-piece propeller shafts were designed to absorb a predetermined amount of energy under both high loads and low loads depending on the characteristics needed from the propeller shaft and the amount of energy needed to be absorbed in the propeller shaft. Many prior art vehicles are generally designed with crumple zones that will allow the vehicle to absorb energy at a predetermined rate during collisions to prevent the transfer of such energy to the vehicle occupants within the passenger compartment. The amount of energy required to collapse the propeller shaft or telescope within itself is the amount of energy absorbed while the telescoping is active and could have an influence on the crumple zone performance of the vehicle during the collision event.

Some of the prior art propeller shafts will deform under certain loading conditions but many of these crash features that are designed into the propeller shaft are often complex and increase the cost of the propeller shaft and constant velocity joint to unrealistic prices. Furthermore, the prior art prop shafts encounter obstacles when they are designed for relatively low collision or collapse forces because a strong robust propeller shaft is required at the same time for everyday use in modern day vehicles. Prior art collapsible propeller shafts tend to absorb energy in a one time manner and once they have collapsed they will no longer perform any energy absorbing characteristics which may be needed to further protect the passenger compartment of the automotive vehicle during the crash event. It should also be noted that some of the prior art collapsing propeller shafts also rely on collapsible constant velocity joints which allow the inner race and other components of the propeller shaft to be expelled through a bore of an outer race to allow the telescoping of the propeller shaft for the absorption of such energy or to prevent high reactive forces from developing in a crash event of an automotive vehicle.

Therefore, there is a need in the art for a collapsible multi-piece propeller shaft including a collapsible constant velocity joint that is capable of being designed to control when and how large the collapsing force profile is during a crash event. There is also a need in the art to produce such a propeller shaft that is easier to install, manufacture, is lighter in weight and will reduce the cost of the propeller shaft and drive train system as a whole. Furthermore, there is a need in the art for a collapsible multi-piece propeller shaft and constant velocity joint that can absorb energy from a collision event of a vehicle at multiple intervals during the crash event. This will help to absorb energy at varying times during the crash event while helping to maintain the structural integrity of the automotive vehicle. The use of such a multi-piece collapsible shaft and constant velocity joint will reduce the cost of making and installing the unit into the automotive vehicle while also reducing any loss of containment of the passenger compartment of a vehicle during a crash event. Therefore, there is also a need in the art for a newly designed constant velocity joint that will allow the crash event to absorb energy at a predetermined rates and absorb predetermined amounts thus effecting greater crash worthiness of the overall vehicle and also not be adversely affected by the weld heat.

SUMMARY OF THE INVENTION

One object of the present invention is to provide an improved constant velocity joint.

Another object of the present invention is to provide a constant velocity joint that is collapsible in conjunction with a propeller shaft at a predetermined axial load and crash plunge distance.

Yet a further object of the present invention is to provide a propeller shaft having a collapsible constant velocity joint having a cap that is ruptured when a specified axial load is applied thereto.

Still a further object of the present invention is to provide a grease cap for a constant velocity joint that is capable of sealing grease inside the joint during the vehicle life while being sufficiently durable to not break or crack during use or handling of the joint and prop shaft, but capable of breaking during a crash event when a predetermined load is applied thereto.

Still another object of the present invention is to provide a cap for a constant velocity joint that is retained within the constant velocity joint by a variety of securing methods such as staking, interference fit between the cap and an outer race, welding, etc.

Still another object of the present invention is to provide a tunable collapsible constant velocity joint for use in a collapsible prop shaft capable of being tuned to predetermined crash specifications depending on the vehicle.

Still another object of the present invention is to provide a cap for use in a collapsible constant velocity joint that has a plurality of machined, formed or scored lines on the cap to allow for peeling or rupturing of the cap during a crash event of an automotive vehicle.

To achieve the fore going objects, a grease cap for use in a collapsible constant velocity joint is disclosed. The grease cap includes a body generally having a circular disc like shape. The grease cap may also includes an orifice through the body for venting purposes. The grease cap includes at least one reduced thickness groove on a surface of the body. The reduced thickness groove can take the form of a plurality of shapes such as a star, pie shape, a circle, etc. The body may also have a circumferential flange extending from an end. The grease cap having the reduced thickness groove therein will allow for the grease cap to fold away at a predetermined axial load during a crash event for a vehicle. The grease cap is connected by many different methodologies to the outer race of the constant velocity joint. The methods for connection may be anything, such as staking the grease cap in place, an interference fit between the cap and the outer race, welding the cap to the outer race, etc.

One advantage of the present invention is that it provides a novel cap for use in a collapsible constant velocity joint.

Still another advantage of the present invention is that the number of reduced width lines on the cap can vary thus creating a tunable cap for use in failing at a predetermined load during a crash event depending on design requirements.

Still another advantage of the present invention is that the frangible grease cap is sufficiently strong to not fail during handling of the joint or prop shaft or during assembly of the constant velocity joint and prop shaft into the vehicle, but is capable of breaking at a predetermined load during a crash event of the automotive vehicle.

Still another advantage of the present invention is the method of securing the grease cap to the outer race to allow for a predetermined axial load to dislodge the cap from the outer race.

Still another advantage of the present invention is that the grease cap for the collapsible constant velocity joint may be used in conjunction with other energy absorbing methods to further increase or decrease the energy or force being absorbed during a crash event and achieve the desired force vs. distance profile.

Yet another advantage of the present invention is that the frangible grease cap is capable of absorbing energy at multiple time intervals thus creating a delayed energy absorbing characteristic during a crash event for a vehicle.

Other objects, features and advantages of the present invention will become apparent from the subsequent description and the appended claims, taken in conjunction with the accompanying drawings.

DESCRIPTION OF THE EMBODIMENT(S)

Figure 1:
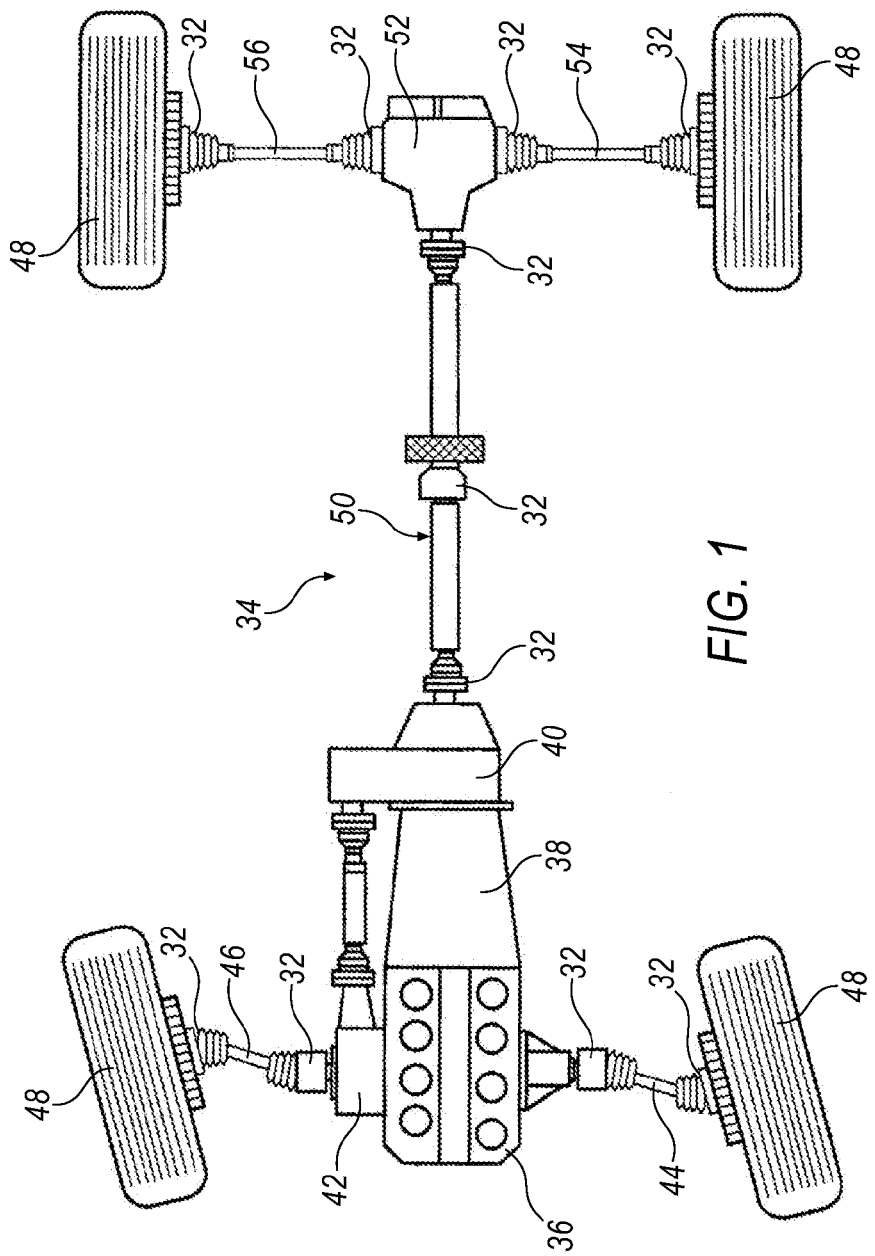
FIG. 1 shows a schematic view of a vehicle system according to the present invention.

Referring to the drawings, a grease cap 30 according to the present invention is shown. The frangible grease cap 30 is for use on any known constant velocity joint 32 such as a plunging tripod, fixed tripod etc., which may be used in an all wheel drive, four wheel drive, front wheel drive or rear wheel drive vehicle. The constant velocity joint 32 includes a novel improved method of connecting the novel and improved grease cap 30 thereto.

FIG. 1 shows a typical driveline 34 of an automotive vehicle. The driveline 34 is a typical all wheel drive vehicle driveline, however it should be noted that the constant velocity joints 32 of the current invention may also be used on rear wheel drive vehicles, front wheel drive vehicles, all wheel drive and four wheel drive vehicles. The driveline 34 includes an engine 36 that is connected to a transmission 38 and a power take off unit 40. The driveline includes a front differential 42 and includes a left hand front half shaft 44 and a right hand front half shaft 46 each of which are connected to a wheel 48 and deliver power to the wheels. On both ends of the left front half shaft 44 and right front half shaft 46 are constant velocity joints 32. A propeller shaft 50 connects the power take off unit 40 to the rear differential 52. The rear differential 52 includes a right hand rear half shaft 54 and a left hand rear half shaft 56 each of which is connected to a wheel 48 on an end thereof. A constant velocity joint is located on both ends of the right hand rear half shaft 56 and left hand rear half shaft 54 that connect the wheel 48 and the rear differential 52. The propeller shaft 50 is a multi-piece propeller shaft that may include a plurality of Cardan joints and at least one high speed constant velocity joint 32. The constant velocity joints 32 transmit power to the wheels 48 through the half shaft assemblies 44, 46, 54, 56 even if the wheels 48 or the shafts have changing angles due to steering, raising, lowering or rear/forward movement of the suspension of the vehicle. The constant velocity joints 32 maybe of any of the standard types known such as plunging tripod, cross groove joint, a fixed joint, a fixed tripod joint, a double offset joint, or any other known constant velocity joint. It should be noted that the above are commonly known terms in the art. The constant velocity joints 32 allow for transmission of constant rotational velocities at angles that are found in everyday driving of automotive vehicles in both the half shaft assemblies and prop shaft assemblies of these vehicles.

Figure 2:
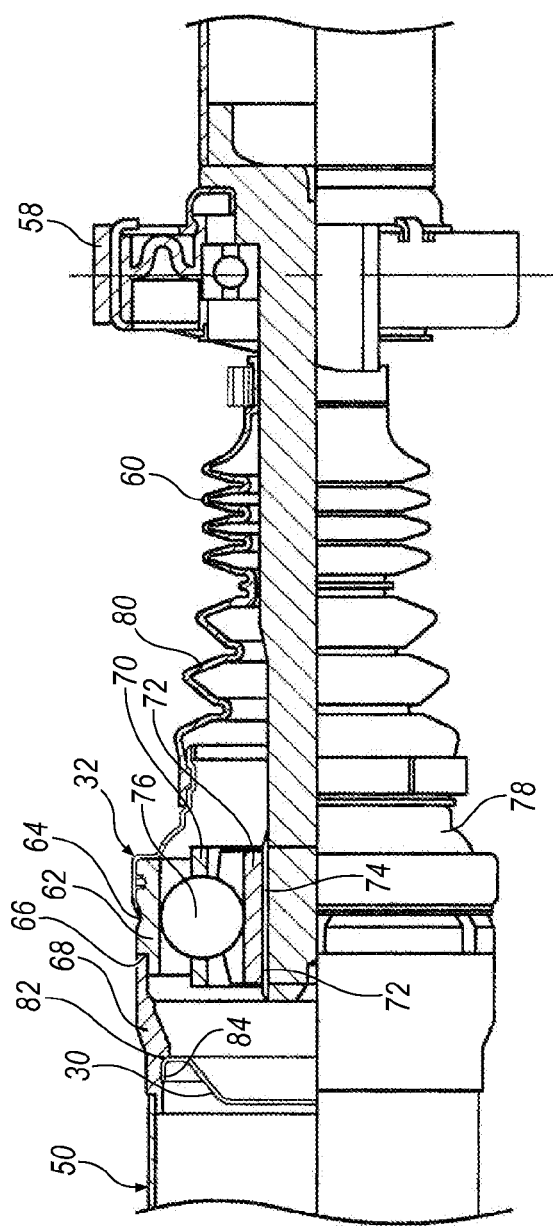
FIG. 2 shows a partial cross section of a constant velocity joint according to the present invention.

FIG. 2 shows a collapsible constant velocity joint 32 according to the present invention. The constant velocity joint 32 in this embodiment is arranged at one end of one piece of the multi-piece propeller shaft 50 while the opposite end of the constant velocity joint 32 is connected to a second portion of the multi-piece propeller shaft 50. On one end of the multi-piece propeller shaft 50 is a center bearing 58, it should be noted that this center bearing 58 could be a Cardan joint or any other known joint that can connect multiple pieces of a multi-piece propeller shaft 50. The constant velocity joint 32 includes a stub shaft 60 that is rotatably connected between the constant velocity joint 32 and the other portion of the multi-piece propeller shaft 50. The constant velocity joint 32 further includes an outer race 62 having a generally ring like appearance. The outer race 62 includes a plurality of circumferential channels 64 located on an outside surface thereof. The outer race 62 may have a shoulder portion 66 which has a sleeve 68 welded or attached thereto. It should also be noted that the sleeve 68 and outer race 62 maybe one solid piece formed without any welding or other connecting means necessary. The outer race 62 is generally made of a steel material, however it should be noted that any other metal material, hard plastic, composite or ceramic may also be used depending on the design requirements of the constant velocity joint 32 and vehicle.

A roller cage 70 is arranged within a bore of the outer race 62 of the constant velocity joint 32. The roller cage 70 includes a plurality of orifices through a surface thereof. An inner race 72 is arranged within the roller cage 70 and includes a bore 72 therethrough. The bore 72 includes a plurality of splines or teeth 74 on an inner surface thereof for connecting with the stub shaft 60. The stub shaft 60 and the inner race 72 are rotatably fixed with respect to one another. It should be noted that the stubshaft 60 and the inner race 72 may also be one solid piece, friction welded together, or connected by other joining means. A plurality of torque transmitting balls 76 are arranged between an inside surface of the outer race 62 and an outer surface of the inner race 72. The balls 76 are arranged within the orifices of the roller cage 70 to ensure the balls 76 stay within the designated ball track on the outer race 62 and inner race 72 thereof respectively. It should be noted that the roller cage 70, the balls 76 and the inner race 72 are all made of a steel material in one embodiment but that it has been contemplated to use any other metal material, ceramic, hard plastic or composite material for use of these parts within the constant velocity joint 32.

A boot cover 78 is connected to one end of the outer race 62 by any known securing means. The boot cover 78 generally has a sleeve like appearance and may be connected in one or more of the outer circumferential channels 64 located on the outer surface of the outer race 62. The opposite end of the boot cover 78 is connected to a boot 80 which contacts the stub shaft 60 on the opposite end thereof. The boot 80 is preferably made of a pliable material such as urethane however it should be noted that any other pliable material such as rubber, plastic, composites or fabric may be used for the boot 80. The material must be able to withstand the high temperatures and high-speed rotation of the constant velocity joint 32 while still staying pliable to accommodate any changes in angles of the constant velocity joint 32 due to driving variances of the automotive vehicle. The constant velocity joint 32 is sealed with a lubricant for life. Generally, the lubricant is a grease which acts to lubricate the rotating internal parts of the constant velocity joint 32 while also preventing or reducing the temperature within the joint itself. Connected on an opposite end of the outer race 62 from the boot cover 78 is a hollow shaft portion of the multi-piece prop shaft 50 which is either welded or connected by any other known securing means to the outer side of the outer race 62.

A grease cap 30 according to the present invention is also arranged within the outer race 62. The outer race 62 may have a shoulder portion 82 that includes a radially inward extending shelf Generally, the grease cap 30 will be arranged against the inner surface of the outer race 62. The grease cap 30 generally has a disc like shape when viewed from a top perspective. The grease cap, 30 in one embodiment shown in FIG. 2, has a cup like cross-section and includes a circumferential flange 84 extending from an end thereof. The grease cap 30 is secured to the inner surface of the outer race 62 by an interference fit between the bore of the outer race 62 and the outer diameter of the circumferential flange 84 of the grease cap 30. It should be noted that in one embodiment the grease cap 30 is made of a metal material however it is contemplated to make the grease cap 30 and all other embodiments of the grease cap explained herein out of any plastic, ceramic, composite, rubber, fabric or any other known material capable of sealing grease inside the constant velocity joint 32 during the life of the vehicle, as long as it is sufficiently strong not to break or crack during handling of the constant velocity joint 32 or prop shaft 50 and during assembly of the constant velocity joint 32 and prop shaft 50 into the automotive vehicle. However, the material must also be able to be broken or dislodged during a crash event when a predetermined load is applied to a surface of the grease cap 30. It should be noted that the grease cap 30 may also include an orifice through a center point thereof for venting any internal pressure or high temperature gases from the inner chamber of the constant velocity joint 32.

The constant velocity joint 32 shown in FIG. 2 is a collapsing constant velocity joint 32 that will collapse when a predetermined axial load is applied thereto. The inner race 72, stub shaft 60, roller cage 70 and torque transmitting balls 76 will move in an axial direction towards the end of the outer race 62 having the grease cap 30 when the axial load is applied. The stub shaft 60 and inner race 72 will first engage with and break through or dislodge the grease cap 32 and continue to travel in an axial direction through the bore of the outer race with the roller cage 70 and torque transmitting balls 76 following behind the stub shaft 60 and inner race 72. This will allow the constant velocity joint 32 to be designed with predetermined force profiles to create specific crash profiles for use in improving and controlling the crash worthiness of the automotive vehicle. The frangible grease cap 30 will work in addition to any other stops that create a barrier for the movement of the collapsible prop shaft 50 such that a predetermined minimum compressive axial force will have to be applied to the prop shaft 50 to begin collapsing of the shaft 50 through the frangible grease cap 30. The grease cap 30 will be designed such that it will absorb a predetermined amount of energy/force during collapse of the collapsible multi-piece propeller shaft 50 such that the stub shaft 60 will be collapsed into the hollow shaft portion of the propeller shaft 50. The grease cap 30 will absorb the impact of the stub shaft 60 and act as a stop against the collapsing propeller shaft 50 thus absorbing a predetermined amount of energy/force at a predetermined time in the crash event. It should also be noted that a second cap maybe located adjacent to the grease cap 30 to allow for multiple energy absorbing stops during the collapsible prop shaft crash event. The thickness of the grease cap 30 along with the method of connecting it to the outer race 62 bore will allow for a varied and tunable crash absorbing mechanical device. Therefore, designers may design the grease cap 30 such that a predetermined amount of force is absorbed/reacted before the cap 30 releases and it may design the grease cap 30 to peel away within a predetermined interval to allow for a time based energy absorption and may act in conjunction with another cap 30 to provide an even greater time frame for absorbing energy during the crash event of the automotive vehicle.

Figure 3:
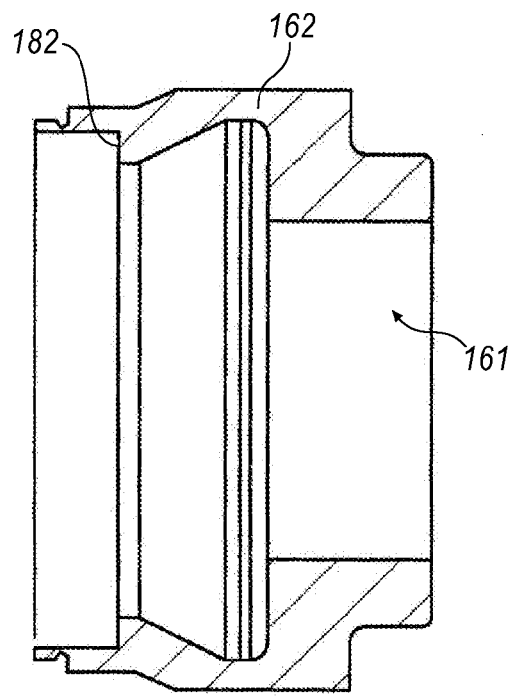
FIG. 3 shows a cross section of an outer race according to the present invention

FIG. 3 shows an alternate embodiment of an outer race 162 that is one piece. Like numerals indicate like parts. The shoulder portion 182 has the grease cap 130 secured therein. The outer race 162 has a predefined bore 161 which will allow for a roller cage 70 and inner race 72 along with a stub shaft 60 to be arranged therein. The constant velocity joint 32 will operate with outer race 162 as that described above and will transmit constant velocities and torques therethrough up to a predetermined angle of inclination with respect to an axis through a center point thereof.

Figure 4:
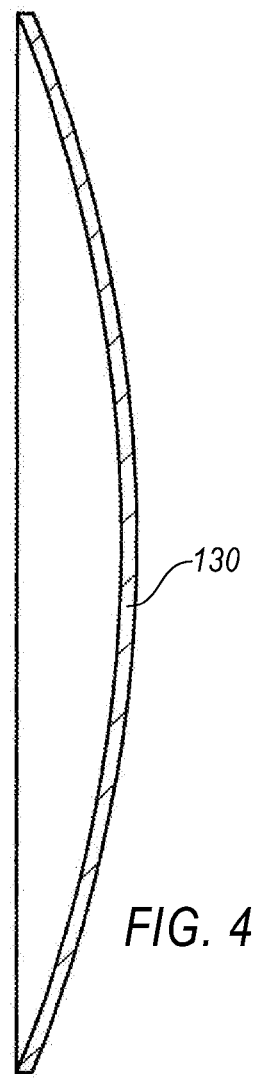
FIG. 4 shows one embodiment of a grease cap according to the present invention.

FIG. 4 shows an alternate embodiment for a grease cap 130. Like numerals indicate like parts. The grease cap 130 shown in FIG. 4 is a Welch plug 130. The Welch plug 130 generally has a disc like shape and in one embodiment it is made of a steel material. However, it should be noted that any other type of plastic, metal, ceramic, composite, fabric etc. that is capable of having a spring force such as that of a Welch plug 130 maybe used. The Welch plug 130 is arranged within the shoulder portion 82 of the bore of the outer race 62 and is installed by inserting it in the bore and then deforming the back face diameter of the Welch plug 130 such that the diameter of the Welch plug 130 engages with the inner surface of the bore of the outer race 62 thus providing a barrier to the grease and the necessary stop characteristics for the collapsible prop shaft 50 during a crash event of the automotive vehicle. The force needed to expel the Welch plug 130 from the bore of the outer race 62 of the constant velocity joint 32 can be changed depending on the thickness of the Welch plug 130, the material used in the Welch plug 130, and the amount of deformation of the back face of the Welch plug 130.

Figure 5:
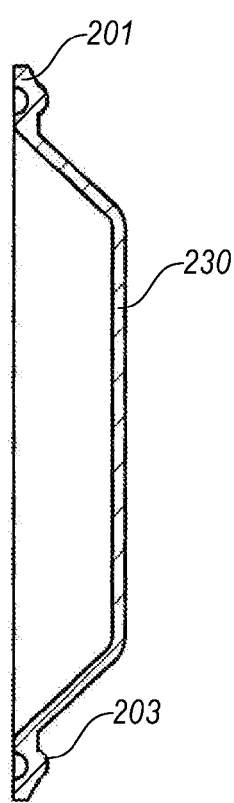
FIG. 5 shows an alternate embodiment of a grease cap according to the present invention.

FIG. 5 shows another embodiment of a grease cap 230 generally having a cup shaped cross-section. A circumferential flange 201 extends from the end of the cup like structure. A circumferential knob or ridge/projection 203 extends around an outer surface of the flange 201 around the entire periphery of the grease cap 230. It should be noted that the circumferential knob 203 may protrude the opposite axial direction and form a depression facing the opposite axial direction. The grease caps as shown in FIG. 4 and FIG. 5 are generally made of a metal however it should be noted that any other type of plastic, ceramic, rubber, fabric, composite or the like material maybe used for the grease caps.

Figure 6:
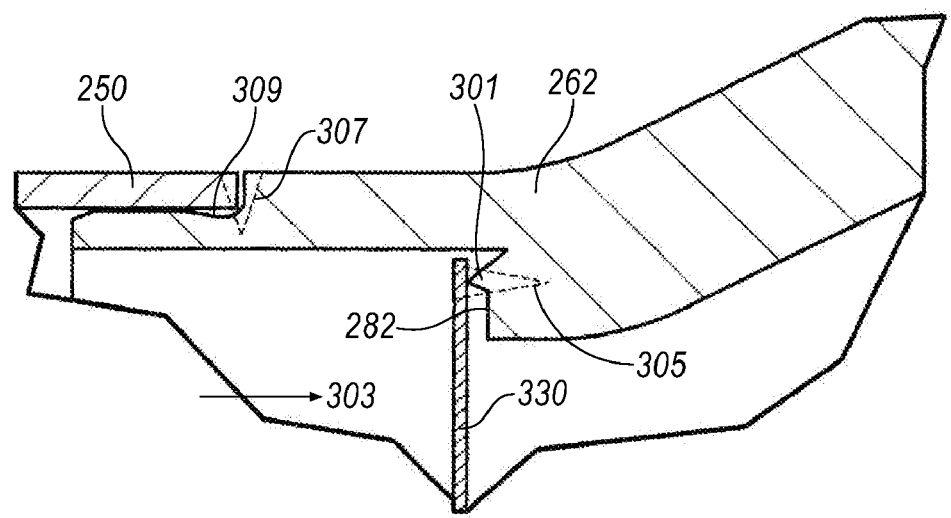
FIG. 6 shows a grease cap prior to welding in an outer race according to the present invention.

FIG. 6 shows an alternate embodiment of securing the grease cap 330 to the outer race 262 of the constant velocity joint 32. FIG. 6 shows the grease cap 330 before welding occurs. The shoulder portion 282 has an annular projection or protrusion 301 located along the shelf surface of the shoulder 282 of the bore 303 of the constant velocity joint outer race 262. The grease cap 330 is arranged within the bore 303 of the outer race 262 and into contact with the protrusion 301 on the shoulder 282 of the outer race 262. Then a current is applied through the grease cap 330 and projection 301 which deforms under axial load and forms a weld 305. A portion of the prop shaft 250 is secured via a weld 307 to the shoulder 309 of the outer race 262.

Figure 7:
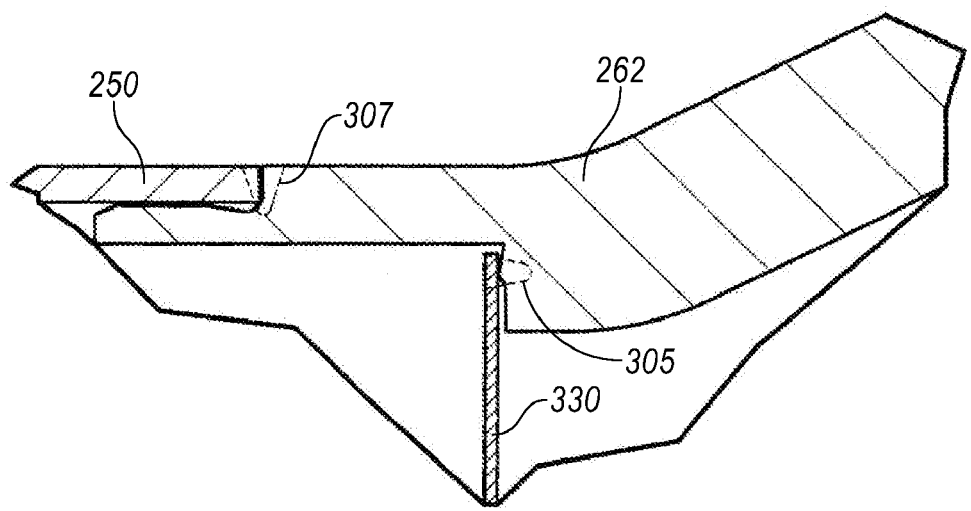
FIG. 7 shows the grease cap of FIG. 6 after being secured to the outer race according to the present invention.

FIG. 7 shows the grease cap 330 secured after the weld 305 is complete. It should also be noted that the hollow tube section of the propeller shaft 250 is also welded to the outer race in this particular methodology but other methods of connecting it may also be used. FIG. 7 shows that the projection 301 is melted or soften during the welding process and allows for the grease cap 330 to have a nearly flat surface relationship with regard 282 to the shoulder of the outer race 262. It should also be noted that other angles of welding maybe used with respect to the axis of the constant velocity joint 32. It is contemplated to use a 45° angle for the annular projection weld however, it should be noted that any other angle maybe used for the projection profile of the weld depending on the angle available during the assembly process of the grease cap 330 to the constant velocity joint 32 and the strength of weld required and/or machining capability. The use of a weld to secure the grease cap 330 will ensure a particular axial load is needed to dislodge the grease cap 330 during a crash event. Therefore, changing the strength of the weld will allow for specific tuning of the absorbing characteristics of the grease cap 330 during a crash event.

Figure 8:
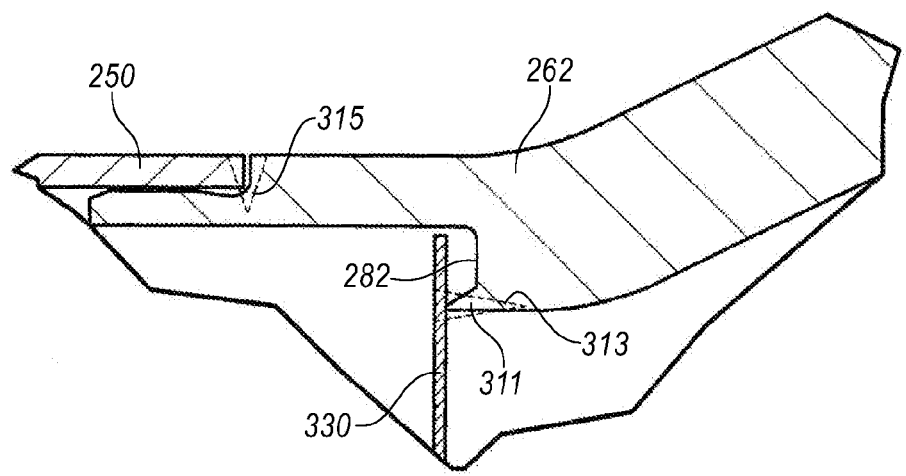
FIG. 8 shows an alternate embodiment of a grease cap prior to welding according to the present invention.

FIG. 8 shows another embodiment of the grease cap 330 being connected to the shoulder 282 of the outer race 262 of the constant velocity joint 32. In this embodiment an annular projection 311 extends along the inner diameter of the shoulder portion 282 of the outer race 262. A weld 313 is once again made by passing a current through the area to be welded until the grease cap 330 is secured to the shoulder 282 of the outer race 262. It should be noted that an electrode may be used to perform the welding function. A second weld 315 is also used to connect the hollow shaft portion of the propeller shaft 250 to the outer surface of the outer race 262 or any other joining method. It should also be noted that any angle or form of projection may be used to connect the grease cap 330 to the constant velocity joint outer race 262 having the projection 311 on the inner radial edge of the shoulder portion 282.

Figure 9:
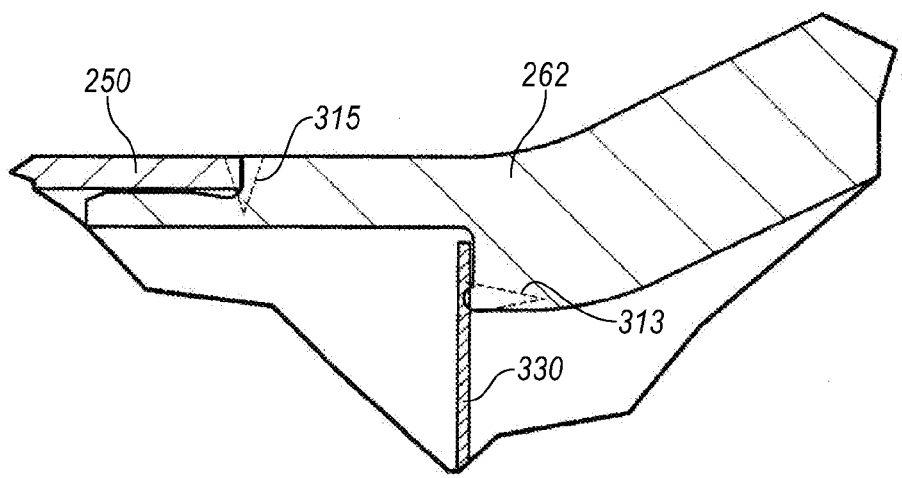
FIG. 9 shows an after view of connecting the grease cap of FIG. 8 according to the present invention.

FIG. 9 shows the grease cap 330 after the weld 313 has been completed from FIG. 8.

Figure 10:
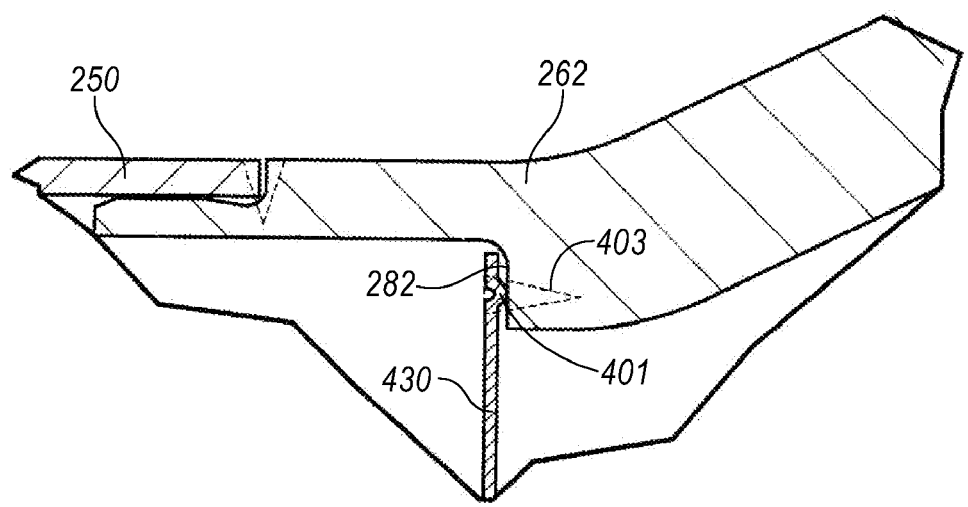
FIG. 10 shows an alternate embodiment of connecting the grease cap according to the present invention.

FIG. 10 shows another embodiment of connecting a grease cap 430 to the constant velocity joint outer race 262. As shown in FIG. 10 the grease cap 430 includes a circumferential nub or projection 401 extending from a surface of the grease cap 430. The nub 401 is placed against the shoulder portion 282 of the outer race 262 and a current/weld 403 is applied thereto. The current weld 403 will have the same effects as that described above.

Figure 11:
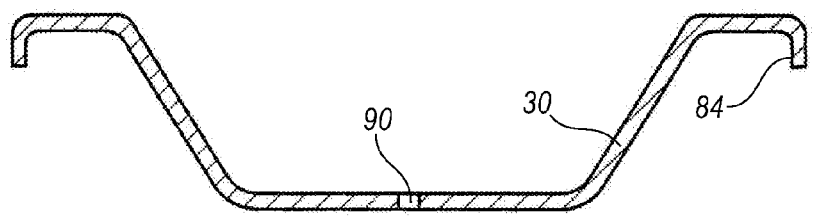
FIG. 11 shows an alternate embodiment of a grease cap according to the present invention.

FIG. 11 shows a cross section of the constant velocity joint frangible grease cap 30 according to the present invention. It should be noted that the cross section includes generally a cup shaped like arrangement. A circumferential flange 84 extends from the edge of the grease cap 30. An orifice 90 is located at a center point of the grease cap 30 to allow for venting of any internal high pressure, high temperature gases. The frangible grease cap 30 maybe secured by a weld in the outer race 62 or by interference or press fit within the outer race 62 depending on the design requirements and axial load needed to remove the grease cap 30 in a crash event. Other joining methods such as gluing may be used. It should also be noted that supplementary sealing may also be provided by gasket or liquid sealant.

Figure 12:
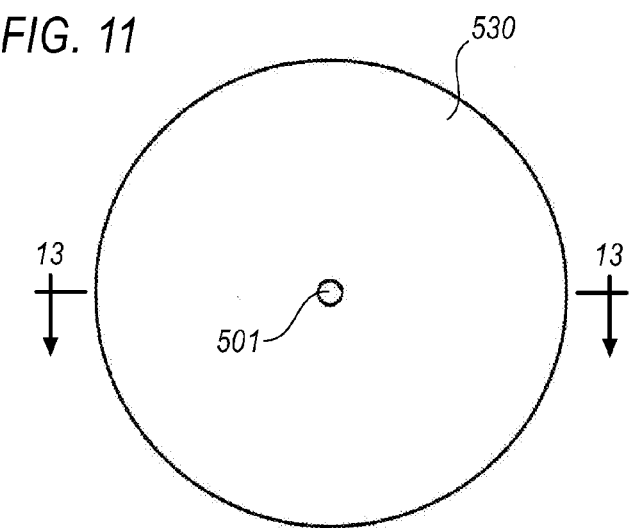
FIG. 12 shows a top view of a grease cap according to the present invention.

FIG. 12 shows a top view of an alternate embodiment constant velocity joint grease cap 530 according to the present invention. The grease cap 530 generally has a circular disc like appearance. An orifice 501 is placed through the grease cap 530 at or near a center point thereof.

Figure 13:
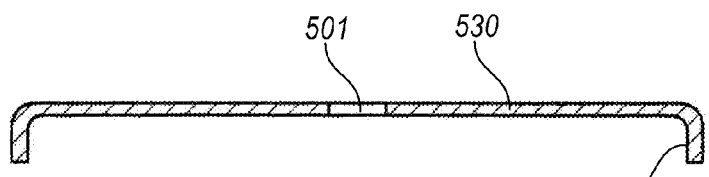
FIG. 13 shows a cross section of the grease cap taken along line 13—13 of FIG. 12.

FIG. 13 shows a cross section taken along line 13—13 of FIG. 12 showing the grease cap 530 having the orifice 501 through a center point thereof and a circumferential flange 503 extending from an edge thereof. It should be noted that the grease cap 530 is made from a steel material in one embodiment but that any other known metal, composite, plastic, ceramic, or fabric may be used for the grease cap 530. The grease cap 530 maybe welded, staked, glued or interference fit/press fit within the outer race 62 of the constant velocity joint 32.

Figure 14:
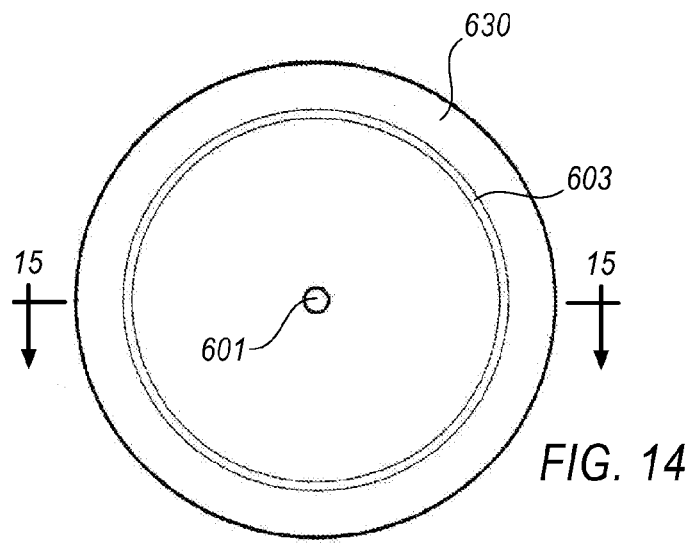
FIG. 14 shows a top view of a grease cap according to an alternate embodiment of the present invention.

FIG. 14 shows an alternate embodiment of the grease cap 630 according to the present invention. The grease cap 630 generally has a circular shape when viewed from the top and includes an orifice 601 through a center point thereof FIG. 14 also includes a circular shaped reduced width thickness line or scoring 603 on one side thereof, but it should be noted that the lines can be on either side or even both sides. The scored or reduced width thickness line 603 represents a thinner section of the material of which the frangible grease cap 630 is made. The scored lines 603, in this case a circular shape can be produced during a stamping process or machine directly into the frangible grease cap 630.

Figure 15:
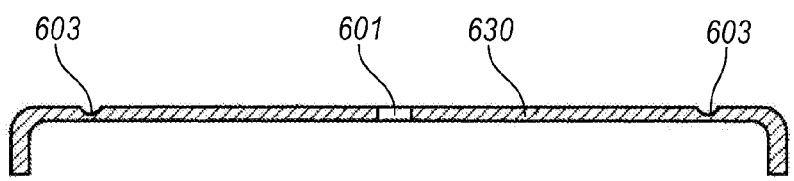
FIG. 15 shows a cross section of the grease cap of FIG. 14 taken along line 15—15.

FIG. 15 shows a cross section of FIG. 14 showing the reduced thickness circumferential line 603. It should be noted that the material of the grease cap 630 maybe a metal material but that any other material such as plastic, ceramic, rubber, fabric, composite may also be used. During a crash event the grease cap 630 will have the circular section which is scored by the reduced thickness line 603 punched out by the stub shaft 60 at a given force thus absorbing energy during the collision event at a predetermined rate and time interval.

Figure 16:
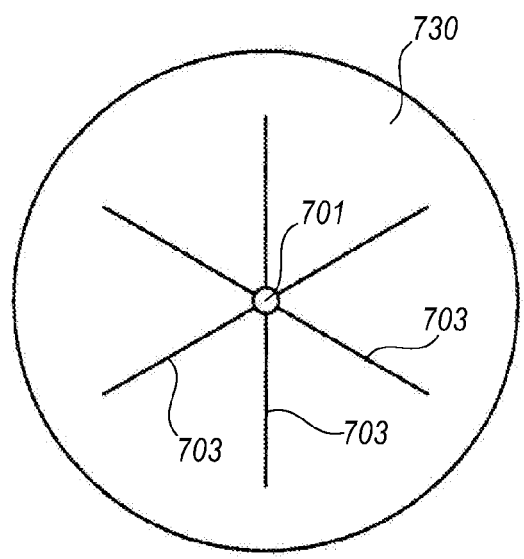
FIG. 16 shows an alternate embodiment of a grease cap according to the present invention.
Figure 17:
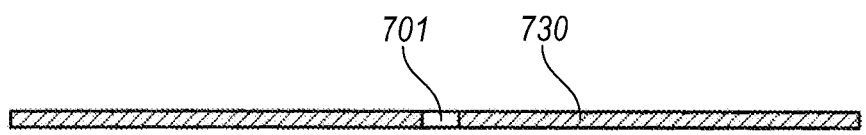
FIG. 17 shows a cross section of the grease cap according to FIG. 16 taken along line 17—17.

FIG. 16 shows an alternate embodiment of the frangible grease cap 730 according to the present invention. FIG. 17 shows a cross section of grease cap 730 having an orifice 701 through a center point thereof. A plurality of scored lines 703 extend from the center point at predetermined intervals. The lines 703 form pie shape portions or a star like shape around the center point of the frangible grease cap 730. As shown in the cross section of FIG. 17 the frangible grease cap 730 does not have a circumferential flange extending therefrom, but in another contemplated embodiment it may. The lines 703 which form the pie shaped sections are also reduced width thickness, such as those found in FIG. 14, during a crash event the pie shaped segments will peel away in an outer axial direction when contact with the stub shaft 60 and inner race 72 is made thereon. It should be noted that the axial load at which the grease cap 730 fractures can be predetermined by adjusting or varying 1) the depth of the reduced thickness lines 703 therein, 2) the properties of the material the grease cap 730 is made of, 3) the thickness of the grease cap 730, and 4) the number and orientation of lines of weakness. Therefore, a designer can tune the grease cap 730 to fail at a predetermined force and absorb a predetermined amount of energy at a predetermined time during a crash event.

Figure 18:
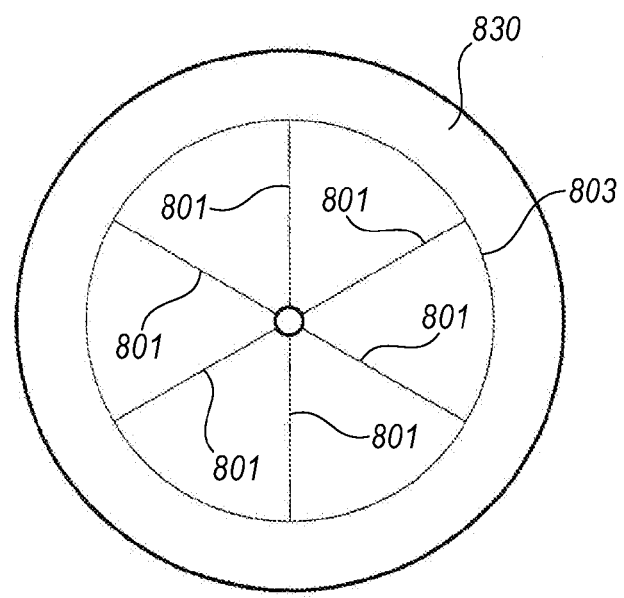
FIG. 18 shows an alternate embodiment of a grease cap according to the present invention.

FIG. 18 shows another embodiment of a grease cap 830 according to the present invention. The grease cap 830 has a plurality of scored lines 801 equal distantly arranged from a center point thereof on one surface of the frangible grease cap 830. A circumferential scored line 803 is located at a predetermined radius from the center point of the frangible grease cap 830 and encloses and contacts the scored lines 801 extending in equal distant predetermined angles from the center point. This will allow the frangible grease cap 830 to peel away and/or punch out the circular section at predetermined intervals when a predetermined axial load is placed thereon. As noted above for the above figures the grease cap 830 is made of a metal material but the grease cap 830 maybe made from any plastic, ceramic, composite or any other material depending on the design requirements and amount of crash absorbing energy that needs to be absorb by the frangible grease cap 830 or the force needed to make the cap fail.

Figure 19:
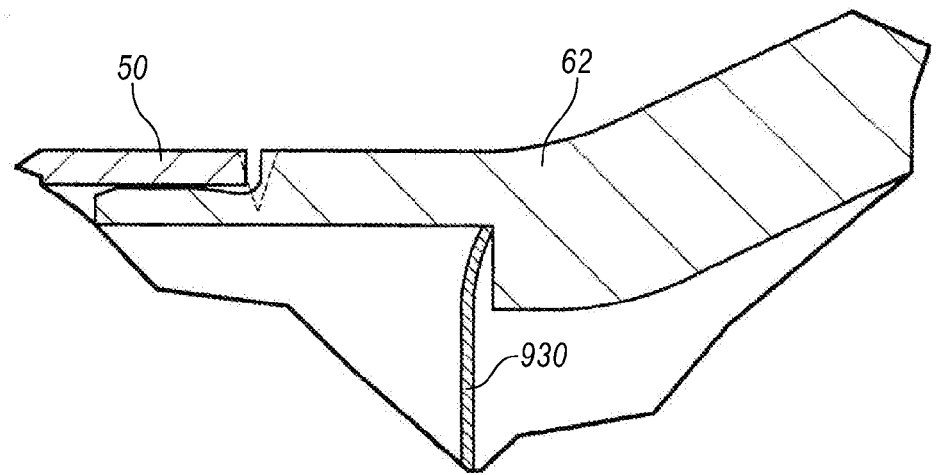
FIG. 19 shows an alternate embodiment of connecting the grease cap to a constant velocity joint according to the present invention.

FIG. 19 shows an alternate embodiment of a frangible grease cap 930 having an interference fit with the inner bore of the outer race 62. This will allow the frangible grease cap 930 to seal in a lubricant while not releasing until a predetermined axial load is applied thereto by a stub shaft during a crash event. As shown in FIG. 19 the hollow portion of the collapsible prop shaft 50 is welded to the outer surface of the outer race 62.

Figure 20:
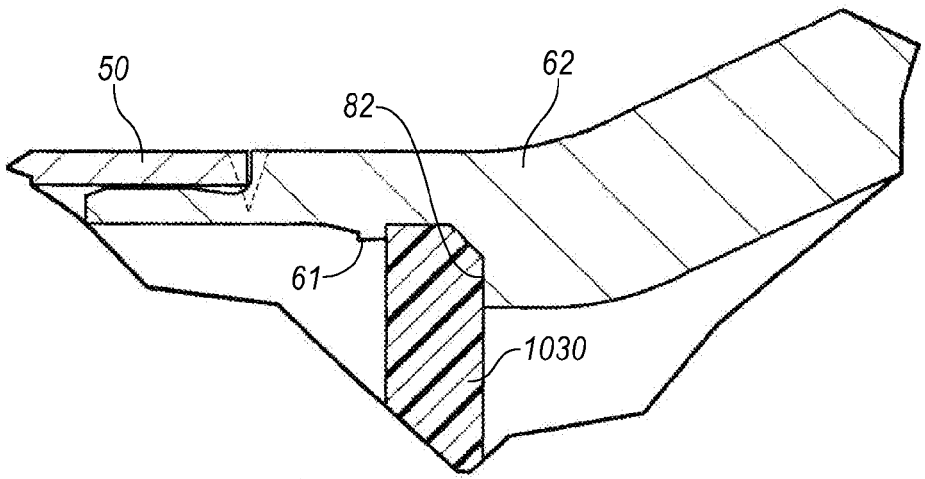
FIG. 20 shows an alternate embodiment of connecting the grease cap to a constant velocity joint according to the present invention.

FIG. 20 shows another embodiment of connecting a frangible grease cap 1030 to the inner bore of the outer race 62. A snap fit arrangement is used to secure the grease cap 1030 to the outer race 62. A ring like or ramp protrusion or circlip and circlip groove 61 is located on an inner surface of the outer race 62 adjacent to the shoulder portion 82 of the outer race 62. The frangible grease cap 1030 is arranged such that it is retained by the protrusion 61 and is secured between the protrusion 61 and the shoulder 82 of the outer race 62. This will hold the grease cap 1030 within the outer race 62 until a predetermined axial load is applied thereto by the stub shaft 60 during a crash event, in which instance the grease cap 1030 breaks and is pushed out by the stubshaft.

Figure 21:
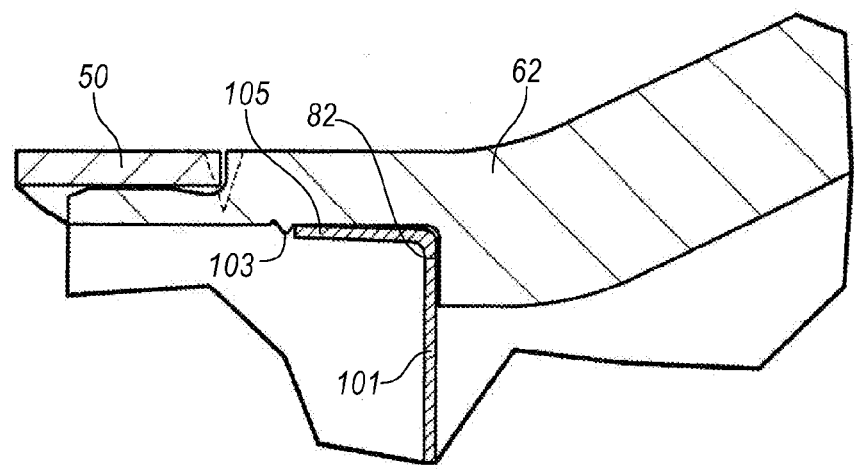
FIG. 21 shows an alternate embodiment of connecting a grease cap to a constant velocity joint according to the present invention.

FIG. 21 shows another alternate embodiment of securing a grease cap 101 to the outer race 62 of the constant velocity joint 32. The grease cap 101 is arranged within the shoulder portion 82 of the outer race 62 and then the inner surface of the constant velocity joint 32 is staked by any known mechanical means such that a portion of the inner surface of the outer race 62 is raised 103 and holds the constant velocity joint grease cap 101 in a proper position. It should be noted that the grease cap 101 will be released when a predetermined axial load is applied thereto. It should be noted FIG. 21 shows a grease cap 101 having a circumferential flange 105 but the staked method of retaining the grease cap may also be used for a flat disc like grease cap. Therefore, the type of grease cap along with the method of connecting the grease cap to the outer race both can alone or in combination with each other be used to specifically tune crash absorbing characteristics.

Figure 22:
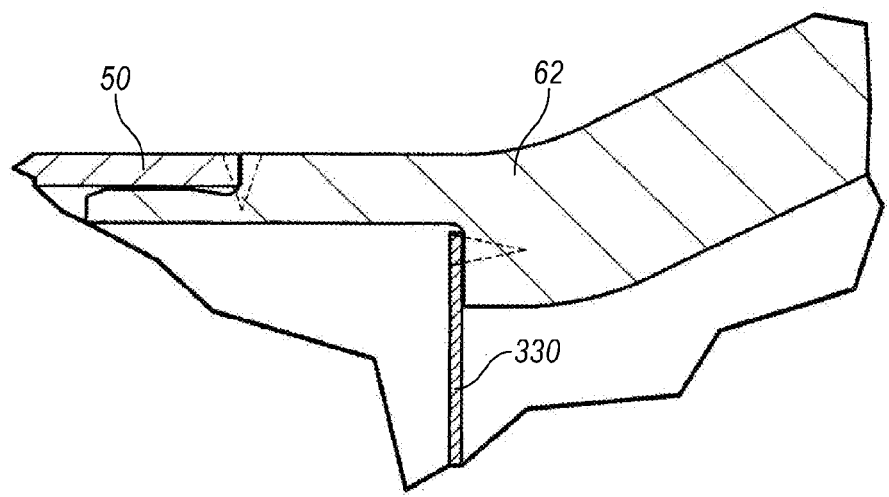
FIG. 22 shows an alternate embodiment of connecting a grease cap to a constant velocity joint according to the present invention.

FIG. 22 shows a flat grease cap 330 being connected via an alternate method. The method welds the end of the grease cap 330 to the shoulder portion 82 of the outer race 62 while also welding the hollow portion of the collapsible prop shaft 50 to the outer surface of the outer race 62.

Figure 23:
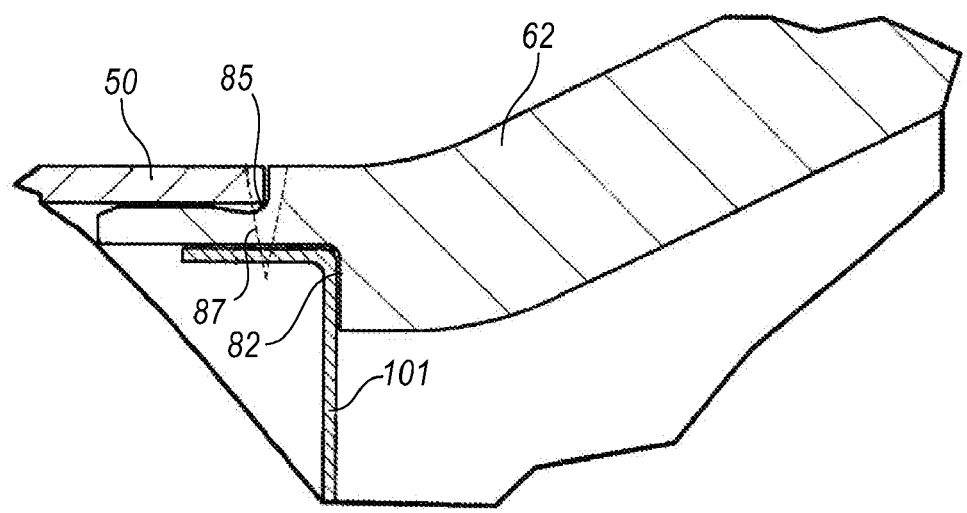
FIG. 23 shows an alternate embodiment of connecting a grease cap to a constant velocity joint according to the present invention.

FIG. 23 shows yet another embodiment of connecting the grease cap 101 to the outer race 62 of the constant velocity joint 32. The shoulder 82 of the outer race 62 is arranged such that it is adjacent to an outer shoulder portion 85 that receives the hollow tube of the propeller shaft 50 of the constant velocity joint 32. A single weld 87 is then used to connect both the hollow tube 50 and the frangible grease cap 101 to the outer race 62.

Figure 24:
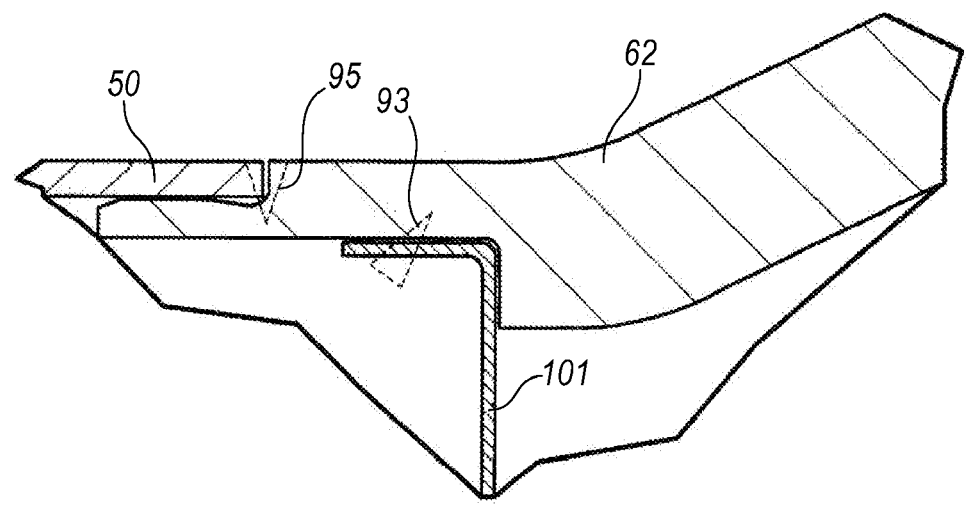
FIG. 24 shows an alternate embodiment of connecting a grease cap to a constant velocity joint according to the present invention.

FIG. 24 shows another alternate embodiment of connecting a frangible grease cap 101 to the outer race 62 of the constant velocity joint 32. In this embodiment a weld 93 having a predetermined angle with relation to an axis of the constant velocity joint 32 is used to secure the grease cap 101 to the inside surface of the outer race 62 while the hollow tube 50 is secured via a weld 95 to an outer surface of the constant velocity joint outer race 62. It should be noted that any angle from 0° to 90° maybe used to connect the grease cap 101 to the inner surface of the outer race 62.

Figure 25:
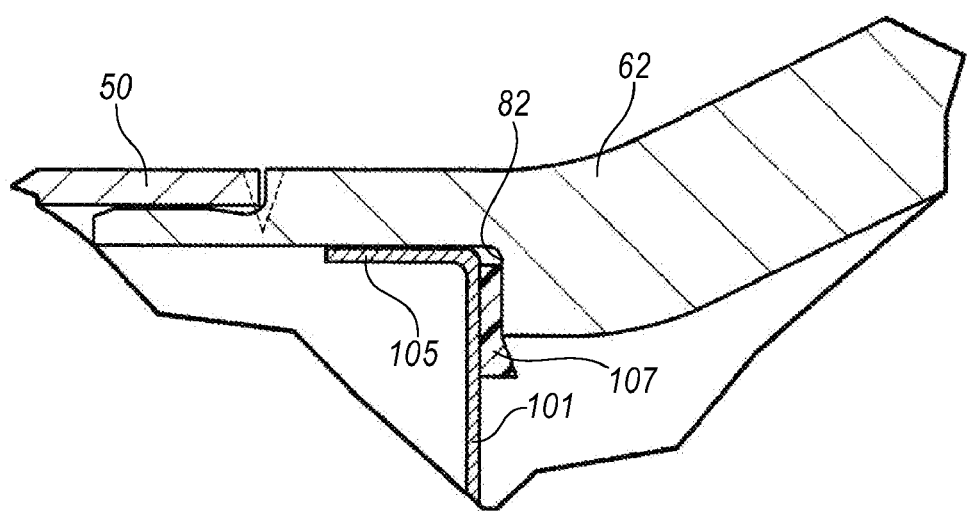
FIG. 25 shows an alternate embodiment of connecting a grease cap to a constant velocity joint according to the present invention.

FIG. 25 shows yet another alternate embodiment of connecting the frangible grease cap 101 to the inner bore of the outer race 62 of the constant velocity joint 32. A gasket 107 is arranged between a surface of the grease cap 101 and a shoulder portion 82 of the outer race 62. An interference fit is used between the circumferential flange 105 of the grease cap 101 and the inner surface of the outer race 62. The gasket 107 is placed between the shoulder portion 82 of the outer race 62 and a surface of the grease cap 101. It should be noted that the gasket 107 maybe made of any type of pliable material, in one embodiment rubber is the preferred material but any other soft rubber, ceramic, metal, plastic, cloth or fabric may also be used. It should further be noted that the gasket 107 maybe bonded directly to the grease cap 101 or directly to the shoulder portion 82 of the outer race 62 or to neither before insertion thereof. It should also be noted that the mating surfaces may be coated with a liquid sealant.

Therefore, in operation the frangible grease cap 30 allows the collapsible prop shaft 50 used in conjunction with a collapsible constant velocity joint 32 to fail at a predetermined load and absorb a predetermined amount of energy during a crash event of an automotive vehicle. This will encourage the containment field within a passenger compartment of an automotive vehicle to remain intact during the crash event. The frangible grease cap 30 will be used in conjunction with the constant velocity joint 32 to perform the energy absorbing, and allow telescoping at a given force during the collapsing of the collapsible propeller shaft 50. The grease cap 30 may be designed such that reduced thickness lines thereon will represent thinner section of material which can be reduced during a stamping process or machining process and which can be set to varying depths. The grease cap 30 can also be designed to vary the depth of the actual thickness of the cap 30 and different material properties of the cap 30 to ensure a tunable grease cap 30 for each crash event as required per specified vehicle requirements. The method of connecting the grease cap 30 to the outer race 62 also may be used to tune and increase or reduce the failure load depending on the vehicle requirements. This retention maybe done by staking, metal deforming, interference fit or press fit of the cap 30 within the bore, welding, or any other known chemical or mechanical bonding method. The method of attaching the grease cap 30 to the outer race 62 will allow for a predetermined axial load being the catalyst necessary to remove the grease cap 30 from the outer race 62 thus absorbing energy at a predetermined rate for a predetermined amount of time. The grease cap 30 will be designed such that it will keep the grease sealed within the joint during everyday normal operation and installation but will break and absorb energy during a crash event when a predetermined axial load is applied thereto by a stub shaft 60 of the constant velocity joint 32.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention maybe practiced otherwise then as specifically described.

What is claimed is:

1. A grease cap, said grease cap including:
   a body having a thickness;
   an orifice through said body; and
   at least one reduced thickness groove on a planar surface of said body, said groove extends a predetermined distance into said surface of said body, said predetermined distance being generally less than said thickness of said body, said groove will allow the grease cap to fracture about said groove at a predetermined load.

2. The grease cap of claim 1 wherein said body having a circular disc-like shape.

3. The grease cap of claim 2 wherein said body has a circumferential flange extending from an end.

4. The grease cap of claim 1 wherein said body generally has a cup like shape.

5. The grease cap of claim 4 wherein said body has a circumferential flange, said flange having a knob extending around a periphery of said flange.

6. The grease cap of claim 1 wherein said body generally has a generally circular shape, said body having a predetermined spring coefficient.

7. The grease cap of claim 1 wherein said groove has a circular pattern.

8. A grease cap, said grease cap including:
   a body having a thickness;
   an orifice through said body; and
   at least one reduced thickness groove on a planar surface of said body, said groove extends a predetermined distance into said surface of said body, said predetermined distance being generally less than said thickness of said body, said at least one reduced thickness groove includes a plurality of radial lines extending from said orifice, said at least one reduced thickness groove further includes a circular pattern located at the end of said radial lines.

9. A method of attaching a frangible grease cap to a constant velocity joint, said method including the steps of:
   aligning the cap with respect to a centerline of the constant velocity joint;
   inserting the cap into a shoulder portion of the constant velocity joint; and securing the cap to the constant velocity joint with a predetermined force, the cap including at least one reduced thickness groove and being capable of fracturing about said groove at a predetermined axial load to allow energy to be absorbed at a predetermined rate for a predetermined amount of time during a crash event.

10. The method of claim 9 wherein said securing step includes a Welch plug cap with a predetermined deformation force.

11. The method of claim 9 further including welding the cap to said shoulder portion, said shoulder portion having a circumferential ridge.

12. The method of claim 11 wherein said welding has a predetermined angle with respect to said centerline.

13. The method of claim 9 wherein said securing step further includes said cap having a snap-fit within the constant velocity joint.

14. The method of claim 13 wherein said cap is made of a plastic material.

15. The method of claim 9 wherein said securing step further includes the step of staking the cap.

16. The method of claim 9 further including the step of bonding a gasket to the cap, said gasket contacts the cap and the constant velocity joint.

17. The method of claim 11 wherein said welding to secure the cap is a through weld from an outside of the constant velocity joint.

18. A grease cap, said grease cap including:
a body having a predetermined thickness; and
a groove or line on one planar surface of said body, said groove or line having a thickness less than said predetermined thickness of said body, said groove or line having a predetermined shape and pattern on said surface of said body, said groove will allow the grease cap to fracture about said groove at a predetermined load.

19. The grease cap of claim 1 wherein said grooves include a plurality of radial grooves extending from said orifice.

20. The grease cap of claim 1 wherein said at least one reduced thickness groove has a circular shaped cross section.

* * * * *